Patented Apr. 7, 1936

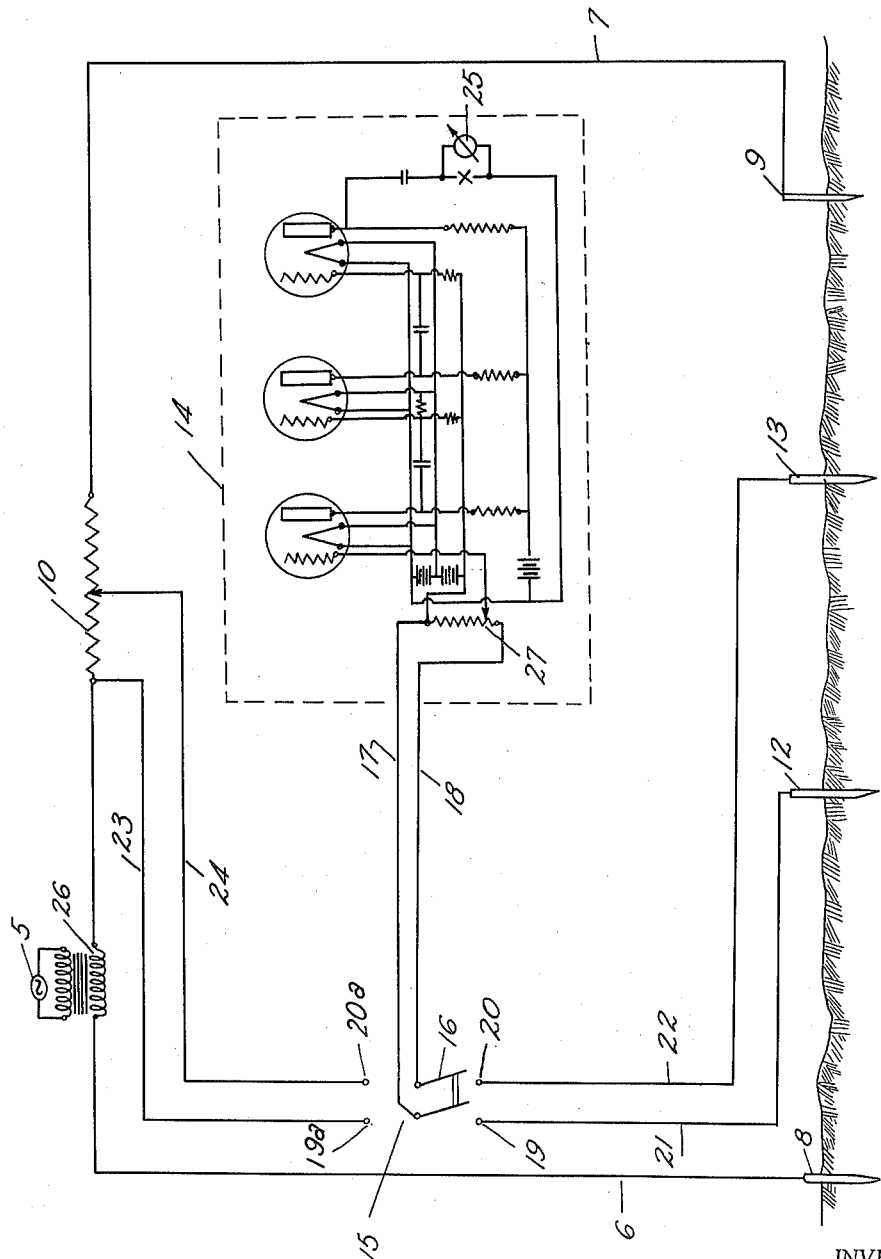

2,036,193

UNITED STATES PATENT OFFICE 2,036,193

MEASURING EARTH RESISTANCES

James Boyd, Denver, Colo., and Burt E. Moritz, Jr., Chicago, Ill.

Application January 23, 1934, Serial No. 708,006

1 Claim. (Cl. 175—182)

This invention relates to a method of ascertaining varying geophysical conditions of subterranean portions of the earth crust by measuring differences in the electrical conductivity of the same.

The conditions above referred to may relate to the presence of ore bodies which differ in their ability to conduct electricity from the rocks which surround the same, or to the presence of fractured or broken zones and the thickness and extent of loose or alluvial material, or to the presence of water- and oil-bodies.

The invention is therefore particularly adapted for determining the location of mineral deposits, as an aid in mining, for ascertaining the position of water- or of oil-bearing structures for use in determining structure or stratum and for the location of wells and openings to prospect the same, or for observing the geological conditions of the earth crust as a preliminary to engineering work, such as the construction of dams, the driving of tunnels, etc.

The present invention has borrowed from the prior art in that it includes the use of a plurality of electrodes in electric circuits, driven into or otherwise connected with the ground in spaced relation to each other, and measuring elements to ascertain by the current flow, the potential differences between the electrodes. In other methods of the above stated character, these measuring elements have given a basis for more or less intricate calculations to compute the resistivity which indicates the geophysical conditions of the structures between the potential electrodes.

In the present invention the elements connected in the circuits cooperate to directly indicate the differences in electrical conductivity of the structure, without the necessity of subsequent calculation or computation, and it is the primary object in the invention to produce this result in a simple, accurate, and practical manner, by the use of devices sensitive to variations in the current flow thru the circuits of which the electrodes are the ground terminals. From the readings thus taken, the specific resistance may be calculated, however, if the necessity should arise.

Another object of the invention is to include in the elements above referred to an amplifier voltmeter, together with an adjustable resistance or other device of similar character.

The accompanying drawing shows a simple diagrammatic representation of the circuits and elements include in the system according to our invention.

Referring to the drawing, the numeral 5 designates a source of alterating current which may be in the form of a direct current to alternating current converter driven by a storage battery. The direct current and alternating current windings may be on the same armature, while the output voltage is altered by a variable transformer.

Opposite poles of the source are, in practice, connected to the ground by means of conductors 6 and 7 terminating in electrodes 8 and 9. Included in the circuit thus established is a calibrated variable resistance 10.

Two other electrodes 12 and 13 likewise connected with the ground, between the others, may be connected in circuit with the grid or grids of an amplifier voltmeter 14, inclusive or exclusive of the variable resistance, by means of a double throw double pole switch 15.

The movable part 16 of the switch is connected with the grid or grids of the voltmeter by conductors 17 and 18. Contacts 19 and 20 to be engaged by said movable part in one position, constitute terminals of conductors 21 and 22 connected to the electrodes 12 and 13, and contacts 19a and 20a at the other side of the movable part of the switch, are connected at opposite ends of the effective resistance 10 by conductors 23 and 24.

Thus either the electrodes 12 and 13 or the resistance may be connected in circuit with the amplifier voltmeter at the will of the operator.

The function of the source of electricity is to pass a current through the ground in order that the distribution and resistance to the current flow may be studied and ascertained.

The voltmeter may be either a vacuum tube voltmeter, or a rectifier type meter, or any other type of sensitive voltage detector well known in the industry, its function being to determine the voltage drop across the electrodes 12 and 13 hereinafter to be referred to as the potential electrodes and to measure the voltage drop across the variable resistance or potentiometer.

The voltmeter includes an amplifier in the form of one or more stages of vacuum tubes of types well known in the industry, the function of the amplifier being to magnify the voltage drops across the potential electrodes and the variable resistance potentiometer in order that they may be accurately measured by the voltmeter.

The amplifier also prevents the voltmeter from drawing an appreciable current from the ground while in use, thus eliminating contact resistance errors in the potential electrodes.

In the operation of the system of interconnected electrical devices as described, a current flow in the ground is established between the outside electrodes 8 and 9. The resistance in the ground to this current flow creates a potential drop between the inside potential electrodes 12 and 13, which is measured in the following manner:

The potential electrodes are first thrown into the amplifier voltmeter circuit by bringing the movable part of the switch into engagement with the contacts 19 and 20, and the potential drop varying, the flow of electrons from the filaments to the plates of the vacuum tube or tubes is measured by an ammeter 25 in circuit with the tubes.

The switch is next reversed to bring the potentiometer 10 into circuit with the voltmeter, after which the resistance is adjusted to the voltage drop previously measured by the ammeter.

In short, the potential drop between the potential electrodes 12 and 13 is ascertained by reading the ammeter in the circuit of the voltmeter, while the latter is in circuit with the electrodes, after which the resistance 10 is brought into circuit with the voltmeter, and varied until the ammeter again indicates the previously ascertained potential drop. The scale of the resistance will then indicate the resistance to the current flow in the ground, and, in consequence denote the geophysical condition of the subterranean portion of the earth in the area between the inside electrodes which, as will be recalled, is the object of the present invention.

Since the amplifier voltmeter draws practically no current from the source, this measuring method is accurate and practical.

In accordance with the equation: $R = V/I$ in which R is the total resistance between the potential electrodes 12 and 13, V is the potential drop, and I is the current flow, it follows that since I is identical in both the resistances, the voltages being made equal by comparison, the resistances between the potential electrodes and in the potentiometer must be identical, hence the known resistance measured by the potentiometer must be equal to the unknown resistance between the potential electrodes.

In short, our system as hereinabove described is based on the theory of measuring the ratio between the potential drop between the electrodes 12 and 13, and the current which produced it.

While we do not wish to be limited to any specified voltage or frequency, it may be stated, as an example, that if the source, consisting of a D. C. to A. C. converter, derives its electric energy from a six-volt storage battery, the output voltage will be from 45 to 270 volts, altered by the variable transformer 26 and the frequency will be approximately 30 to 500 cycles per second, altered by changing the speed of the converter.

It will be readily apparent that this result may also be produced by means of a buzzer which is more adaptable to field work because of its light weight.

A potentiometer 27 in the amplifier voltmeter circuit serves to vary the amplification of the circuit, so that wide ranges of potentials may be measured.

The system is subject to variations, more particularly with relation to the spacing of the ground electrodes; however, irrespective of such variations, the operation is always based upon the above stated theory in accordance with the equation $R = V/I$. Ground electrodes connected to opposite sides of a source of current are an essential of the system, so are potential electrodes, an amplifying voltmeter, inclusive of a measuring element preferably in the form of an ammeter, and a manually or otherwise operated switch, to selectively include in the circuit of the amplifier voltmeter, either the variable resistance or potentiometer, or the potential electrodes.

It will be readily apparent to those versed in the art that, within the scope of the invention, one of the potential electrodes may coincide with one of the outside electrodes, or the spacing of the electrodes may be varied or a third potential electrode may be added.

The amplifier voltmeter per se is not a part of the present invention, and any instrument or assembly of cooperating electrical elements capable of performing the above stated function of increasing and reading voltages may be employed within the meaning of the term "amplifier voltmeter" as used in the hereunto appended claims. Also the variable resistance or potentiometer may be of any well-known construction, and the source of alternating current may be in the form of a converter, as stated hereinbefore.

What we claim and desire to secure by Letters Patent is:

A system of the character described comprising a source of alternating current connected in series with a fixed calibrated resistance and a pair of ground electrodes adapted to be inserted at spaced points in a geological formation, a voltmeter having means to indicate the potential drop between two points without drawing any appreciable current, electrode means for connection to the ground across a portion of the formation between the points at which said first named electrodes are connected to the formation, leads from said calibrated resistance at least one of which is adjustable along said calibrated resistance whereby to place any desired fraction of said resistance between said leads and switching means for connecting said voltmeter selectively to said second named electrode means to determine the potential drop across said portion of the formation, and across said leads from the calibrated resistance to find the resistance necessary to provide the potential drop across said portion of the formation.

JAMES BOYD.
BURT E. MORITZ, Jr.